US006484151B1

(12) United States Patent
O'Shaughnessy

(10) Patent No.: US 6,484,151 B1
(45) Date of Patent: Nov. 19, 2002

(54) SYSTEM AND METHOD FOR SELECTING AND PURCHASING STOCKS VIA A GLOBAL COMPUTER NETWORK

(75) Inventor: James P. O'Shaughnessy, Coscob, CT (US)

(73) Assignee: Netfolio, Inc., New York, NY (US)

( * ) Notice: Subject to any disclaimer, the term of this patent is extended or adjusted under 35 U.S.C. 154(b) by 0 days.

(21) Appl. No.: 09/360,003

(22) Filed: Jul. 23, 1999

(51) Int. Cl.⁷ .............................................. G06F 17/60

(52) U.S. Cl. ......................................... 705/36; 705/38

(58) Field of Search ..................... 705/36, 38

(56) References Cited

U.S. PATENT DOCUMENTS

| | | | | |
|---|---|---|---|---|
| 6,052,673 A | * | 4/2000 | Leon et al. ................... | 705/38 |
| 6,161,098 A | * | 12/2000 | Wallman ..................... | 705/36 |
| 6,175,824 B1 | * | 1/2001 | Breitzman et al. ............ | 705/36 |

FOREIGN PATENT DOCUMENTS

| | | | | |
|---|---|---|---|---|
| WO | WO 00/70506 | * | 11/1980 | ........... G06F/17/50 |
| WO | WO 00/38094 | * | 12/1999 | ........... G06F/17/60 |

OTHER PUBLICATIONS

"Be a Self Made Millionaire" Spark, David—PC/Computing v11 n1 p 99 1/98.*

"Crazy for Online Trading"—Finesse 09SNOTY —Nov. 18, 1996 Computerworld p 153.*

* cited by examiner

Primary Examiner—V. Millin
Assistant Examiner—Geoffrey Akers
(74) Attorney, Agent, or Firm—Elman & Associates

(57) ABSTRACT

The invention is in the field of using a computer to select corporate stocks for investment. A user is connected to the Internet. The user connects to the portfolio management program (PMP) host computer through the Internet. The user reviews certain strategies and their historic performance. The information is transmitted across the Internet to the user. The information transmitted includes such information as historic performance, sample holdings, modeling how the particular strategy and its holding has performed in the past. The user, after making appropriate reviews, makes a decision to purchase the names of the stocks in that portfolio. The owner of the PMP host computer collects a payment for this service. Now the user sees a list of stocks provided by the PMP host computer. If the user can then make the decision whether to accept or reject any individual stock in the generated list. For example, if the user rejects the tenth stock in a ten stock strategy, the PMP host computer presents the eleventh stock as a substitute which may in turn also be rejected. Once the user has approved the content of the proposed portfolio, the user enters an amount that the user will invest in accordance with the strategy. If the strategy has 10 stocks, for example, and the user invests $100,000, the user will have $99,970.05 to invest in the 10 stocks or $9,997 per issue. The user can set up automatic email notification of rebalance dates or to have the PMP vote the proxy of the shares.

8 Claims, 14 Drawing Sheets

110

| Ranked Strategy | One Month |
|---|---|
| 1 | 23.00% |
| 2 | 20.40% |
| 3 | 18.50% |
| 4 | 17.00% |
| 5 | 6.25% |

| Ranked Strategy | One Month |
|---|---|
| 1 | 23.00% |
| 2 | 20.40% |
| 3 | 18.50% |
| 4 | 17.00% |
| 5 | 6.25% |

One Week
One Month
One Quarter
Two Quarters
Three Quarters
One Year
Year-to-date
Two years
Custom

*Fig-* 1C

| Ranked Strategy | One Month |
|---|---|
| 1 | 46.00% |
| 2 | 43.00% |
| 3 | 25.00% |
| 4 | 19.00% |
| 5 | 12.00% |

One Week
One Month
One Quarter
Two Quarters
Three Quarters
One Year
Year-to-date
Two years
Custom

*Fig-* 1D

| Ranked Strategy | One Month | Strategy Name |
|---|---|---|
| 1 | 46.00% | Growth |
| 2 | 43.00% | Index Plus A |
| 3 | 25.00% | Value |
| 4 | 19.00% | Capital |
| 5 | 12.00% | Tech Index Plus |

| Ranked Strategy | One Month | Strategy Name |
|---|---|---|
| 1 | 46.00% | Growth |
| 2 | 43.00% | Index Plus A |
| 3 | 25.00% | Value |
| 4 | 19.00% | Capital |
| 5 | 12.00% | Tech Index Plus |

Index Plus A (sample holdings)
This strategy was designed to have a high correlation to the S&P 500 while still attempting to do better than it over time. It is a 30-stock portfolio composed of the ten stocks from the S&P 500 Index with the greatest market capitalization; the top ten stocks from Growth by price appreciation; and the top ten stocks from Value by price-to-cashflow.

Fig– 2B

| Ranked Strategy | One Month | Strategy Name |
|---|---|---|
| 1 | 46.00% | Growth |
| 2 | 43.00% | Index Plus A |
| 3 | 25.00% | Value |
| 4 | 19.00% | Capital |
| 5 | 12.00% | Tech Index Plus |

Index Plus A (sample holdings)
This strategy was designed to have a high correlation to the S&P 500 while still attempting... over time. It is composed of t... S&P 500 Inde... market capital... stocks from G... appreciation; a... from Value by

Sample Holdings
Safeway
Apple
Best Buy ★
Cablevision
Ann Taylor
Sonic Automotive

Index Plus A (sample holdings)
This strategy was designed to have a high correlation to the S&P 500 while still attempting *Sample Holdings* over time. It is composed of t| Safeway S&P 500 Inde| Apple market capital| Best Buy ★ stocks from G| Cablevision appreciation; a| Ann Taylor from Value by| Sonic Automotiv

Best Buy
Company Report
Quote
Chart
Fundamentals
Company Investor Website

Index Plus A (sample holdings)
This strategy was | 1999 Sample Holdings high correlation to| 1998 Sample Holdings | *Sample Holdings* still attempting to | --- over time. It is a 3| 1980 Sample Holdings | Safeway composed of the t| 1979 Sample Holdings | Apple S&P 500 Index wi| | Best Buy market capitalizati| | Cablevision stocks from Growth by price | Ann Taylor appreciation; and the top ten stocks | Sonic Automotiv from Value by price-to-cashflow.

Best Buy
Company Report
Quote
Chart
Fundamentals
Company Investor Website

| Ranked Strategy | One Month |
|---|---|
| 1 | 46.00% |
| 2 | 43.00% |
| 3 | 25.00% |
| 4 | 19.00% |
| 5 | 12.00% |

| Strategy Name |
|---|
| Growth |
| Index Plus A |
| Value |
| Capital |
| Tech Index Plus |

301

| Holdings |
|---|
| Model |
| Purchase |

*Fig-3A*

| Strategy Name |
|---|
| Growth |
| Index Plus A |
| Value |
| Capital |
| Tech Index Plus |

| Holdings |
|---|
| Model |
| Purchase |

| Super Bull Market |
|---|
| Bull Market |
| Bear Market |
| Super Bear Market |

RECALC WITH | HISTORICAL DATA | SIMULATED DATA

|  | 1 year | 3 year | 5 year | 10 year |
|---|---|---|---|---|
| Average Year | 12.50% | 18.50% | 15.50% | 13.70% |
| Worst Year | 12.50% | 12.50% | -5.00% | -8.00% |
| Best Year | 12.50% | 22.50% | 22.50% | 22.50% |
| $10,000 becomes | $11,250 | $16,640 | $20,555 | $36,108 |

*Fig-3B*

| Strategy Name |
|---|
| Growth |
| Index Plus A |
| Value |
| Capital |
| Tech Index Plus |

| Holdings |
|---|
| Model |
| Purchase |

| Super Bull Market |
|---|
| Bull Market |
| Bear Market |
| Super Bear Market |

302

RECALC WITH | HISTORICAL DATA | SIMULATED DATA

|  | 1 year | 3 year | 5 year | 10 year |
|---|---|---|---|---|
| Average Year | 6.00% | 6.00% | 6.00% | 5.00% |
| Worst Year | 6.00% | 5.00% | -5.00% | -5.00% |
| Best Year | 6.00% | 7.00% | 11.00% | 11.00% |
| $10,000 becomes | $10,600 | $11,910 | $13,382 | $16,288 |

SYSTEM AND METHOD FOR SELECTING AND PURCHASING STOCKS VIA A GLOBAL COMPUTER NETWORK

CROSS REFERENCE TO RELATED APPLICATION

NONE

FIELD OF THE INVENTION

The invention is in the field of using a computer to select corporate stocks for investment.

BACKGROUND OF THE INVENTION

Designed as a possible replacement for mutual funds for individual investors, the invention allows individual investors to put together their own diversified fund using low-cost trades. Because the individual buying shares of stocks is buying and owning the stocks directly, there is no chance of some of the 'tax hits' that one takes with mutual funds.

For example: on day one, investor buys $10,000 of shares in a mutual fund. On day two, the mutual fund liquidates some assets acquired in the past and takes a tax hit. Our day one investor has not enjoyed any of the benefit of increase in price of the liquidated asset but takes the full hit of the tax consequence on the value of the mutual fund's shares on day two.

The present invention allows the shareholder to avoid that tax hit and offers other benefits as well as will become apparent in the following discussion.

SUMMARY OF THE INVENTION

A user is connected to the Internet. The user connects to the portfolio management program (PMP) host computer through the Internet. The user reviews certain strategies and their historic performance. The information is transmitted across the Internet to the user. The information transmitted includes such information as historic performance, sample holdings, modeling how the particular strategy and its holding has performed in the past.

The user, after making appropriate reviews, makes a decision to purchase the names of the stocks in that portfolio. The owner of the PMP host computer collects a payment for this service. This price is preferably $29.95.

Now the user sees a list of stocks provided by the PMP host computer. If the user can then make the decision whether to accept or reject any individual stock in the generated list. For example, if the user rejects the tenth stock in a ten stock strategy, the PMP host computer presents the eleventh stock as a substitute which may in turn also be rejected. Once the user has approved the content of the proposed portfolio, the user enters an amount that the user will invest in accordance with the strategy.

If the strategy has 10 stocks, for example, and the user invests $100,000, the user will have $99,970.05 to invest in the 10 stocks or $9,997 per issue.

If the user already has an account with an online broker, then the owner of the PMP host computer will receive a one-time fee from that online broker when the user purchases the portfolio through the online broker. The one-time fee for referring to an existing account is preferably $30.

If the user does not have an account with an online broker, then PMP host computer provides suggestions to select an online broker. Once the user selects an online broker, then the owner of the PMP host computer will receive a one-time fee from that online broker in the amount of $150. Since online brokerages are currently spending about $400 for each account that opens with them, everyone wins. The present invention attempts to drive mid-tier investors online by providing low cost, tax savings, information, and control of the online portfolio. The present invention wants to make the average Morningstar mutual fund an expensive way to achieve the benefits of a diverse portfolio.

If the user does buy the stocks, the user is presented with a customizable portfolio screen showing all the holdings. This information is optionally stored on the user's harddrive, on the PMP host computer, or preferably both. The user can then sign up for automatic notification of drop in price in certain stocks, place sell orders, etc. as necessary. In addition, the user can sign up for automatic proxy voting.

The user winds up with a balanced portfolio of stocks for $30. This is much cheaper than even the cheapest online brokerage charges, and much cheaper than those charges made by traditional brokers. The user's balanced portfolio is akin to their own personal mutual fund, but without some of the disadvantages that plague those mutual funds.

First, the cost of creating and monitoring this diversified individual portfolio is dramatically less expensive than fees associated with other diversified portfolios like mutual funds. Currently, the average fee, called an expense ratio, of all diversified equity funds in the Morningstar database is 1.55%. An investor with a $100,000 investment in the average mutual fund, would face annual expenses of $1,550 before any commissions, sales load, or 12(b)-1 charges. The same investor using the present invention would face substantially lower total expenses, currently contemplated at approximately $60.

The next major advantage of the present invention is the potential for tax managing the diversified portfolio for the individual investor. One of the largest problems of mutual fund investment is the potential for embedded capital gains that will be distributed to all shareholders of record whether or not they enjoyed the gain from the stock being sold.

For example: on day one, investor buys $100,000 of shares in a mutual fund. On day two, the mutual fund liquidates some long-held security (e.g. 1990 Microsoft) and takes a tax hit. Our day one investor has not enjoyed any of the benefit of increase in price of the liquidated asset but takes the full hit of the tax consequence on the value of the mutual fund's shares on day two.

The third benefit the present invention offers individual is that by creating their own diversified portfolio, they will not be affected by the actions of other shareholders. For example, on day one investor buys $100,000 of shares in a mutual fund. The next day, a sufficient minority of current shareholders of that fund decide, for whatever reason, to liquidate their holdings, the NAB of the fund would be materially affected as the portfolio manager would be forced to liquidate current holdings to meet the redemptions. Users of the present invention will face no such calamity because the diversified portfolio is unique to them.

The invention makes possible for the first time the creation of a diversified portfolio that can be selected, invested in, and monitored continually entirely on the Internet.

Accordingly, then the following are elements of the present invention: the method and apparatus for allowing a user to select strategies and stocks for an inexpensive trade, including: providing a host computer connected to a global computer network; providing said host computer with a portfolio management program; providing said host computer with storage where user account information may be stored; providing at least one user the opportunity to open an account with the portfolio management program owner; providing the user the opportunity to evaluate, select, and modify different methods to choose a recommended portfolio of stocks; providing the use the opportunity to evaluate a strategy's performance over various periods of time; providing the user the opportunity to model the performance of a selected strategy with simulated data; providing the user the opportunity to model the performance of a selected strategy with historical data when said historical data is available; providing the user the opportunity to view the sample holdings of a selected strategy; providing the user a means for inputting the amount of money said user wishes to invest; providing means for calculating the number of shares of each holding that can be purchased through use of quote data; providing a performance option sheet, wherein the user has the opportunity to reject any or all stocks selected in accordance with a particular strategy; providing the user an opportunity to perform the purchase of the selected portfolio through an existing online broker account; providing the user an opportunity to acquire an account at an online broker; receiving from the broker a first referral fee if the user already has an account at that broker; receiving from the broker a second referral fee if the user does not already have an account at that broker; providing for the purchasing user a customized performance page; providing the purchasing user the opportunity to create alerts in the event that any or all stocks drop by certain percentages; providing the purchasing user the opportunity to elect to have the owner of the portfolio management program vote the proxies of any or all issues; providing the purchasing user the opportunity to receive an email reminding the purchasing user of any rebalance dates; providing the purchasing user a custom benchmark; providing the user the opportunity to customize the custom benchmark through the addition or elimination of certain indices and measures; providing the user the opportunity to accept the default version of the custom benchmark; providing means for storing the user's custom benchmark on the local machine; providing means for storing the user's account information on the portfolio management program host machine; providing the user means for adding user enhancements to the custom benchmark page; said enhancements including news, fyi, and alerts on each issue; a newcomer's entry path with investment quizzes; and an experienced investor's entry path.

BRIEF DESCRIPTION OF THE DRAWINGS

FIGS. 1B through 4A represent simulated screen captures of various 'drill down' and 'pop up' menu implementations in accordance with the present invention.

FIGS. 8A and 8B are screen captures showing a prior art portfolio management screen.

DEFINITIONS

Figure 1A:
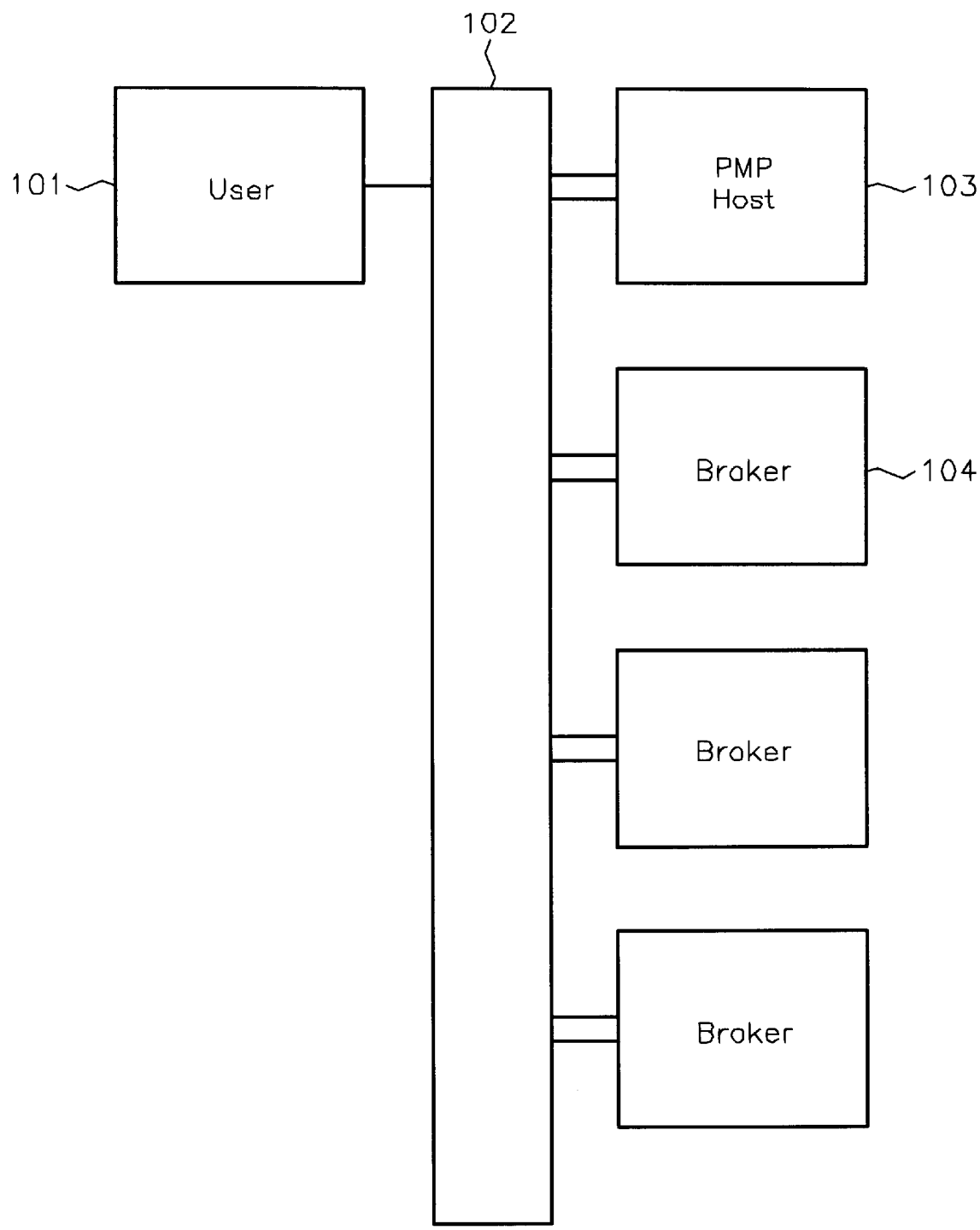
FIG. 1A is a representation of the connections between the user, the PMP host, and online brokers.

Internet: a shorthand for the current Internet or equivalent global communications network, and also contemplates private "Intranets," WANs, and their wired or wireless functional equivalents.

PMP: Portfolio Management Program. The Portfolio Management Program may reside on the user's machine, on a remote server or servers, or both as appropriate. The Portfolio Management Program will be provided with the ability to communicate with the user, preferably through the user's computer's Internet browser program (such as Internet Explorer or Netscape). The program is created in accordance with standard programming practices as known by programmers of Internet applications and Internet stock-trading applications.

Disclaimers: the actual pages, screens, and agreements will be laden with appropriate disclaimers as designed by lawyers and stockbrokers skilled in the art of crafting such disclaimers.

Example stocks, mutual funds and indices: while there may actually be companies called 3M and Walmart and IBM, the performance numbers are fictional. The MELJIM MF and MARBRI MF funds, for example, are fictional.

Introduction to Strategy Investing

Knowing how a particular investment strategy performed historically gives one the vital information one needs on its risk, variability, and persistence of returns. Before the commencement of the inventor's work, there was no widely available comprehensive guide to which strategies are long-term winners and which are not. The inventor had access to the historical S&P Compustat database of United States stock market information: forty-three years of results for Wall Street's most popular investment strategies.

It took the combination of fast computers and huge databases to prove that a portfolio's returns are essentially determined by the factors that define the portfolio. Before computers, it was almost impossible to determine what strategy guided the development of a portfolio. The number of underlying factors (e.g. price-to-earnings ratio, dividend yield) that an investor could consider seemed endless. The best one could do was look at portfolios in the most general ways. With computers, one can also test combinations of factors over long periods of time, showing what one can expect in the future from any given investment strategy.

History shows that traditional active management does not work. The majority of actively managed funds do not beat the S&P 500. Passive index fund managers have seen their assets rise as a result, from $10 billion in 1980 to over $250 billion in 1990.

It is very desirable to use an objective rule-based strategy and system for automating, to the extent practicable, the conduct of this decision-making.

The data presented by the inventor in his books and in other patent applications and soon-to-issue patents proves that the market clearly and consistently rewards certain attributes (e.g., stocks with low price-to-sales ratios) and clearly and consistently punishes others (e.g. stocks with high price-to-sales ratios) over long periods of time. A paradox remains: tests show high return predictability, but 80 percent of traditionally managed mutual funds fail to beat the S&P 500. Models beat human forecasters because they reliably and consistently apply the same criteria time after time.

Stock market decisions and portfolio constructions are served by a methodical scientific method. Certain rules help in this process. First, all models must use explicitly stated rules without ambiguity or allowance for a private or unique interpretation of the rule. Second, the rule must be stated explicitly and publicly so anyone with the time, money, data, equipment and inclination can reproduce the results. Third, someone using the same rules and the same reliable database must get the same results. Fourth, the results must be consistent over time; long-term results cannot owe all their benefits to a few years. Fifth, the rule must be intuitive and logical and not be derived from the data.

The inventor used the S&P Compustat Active and Research Database from 1950 through 1994. The inventor used certain methods to evaluate how different rules for constructing portfolios worked over these periods. Certain choices were made regarding size of the portfolio (50 stocks for most strategies), market capitalization (generally, requiring a minimum of $150 million), and annual rebalancing.

Size of the portfolio. As evaluated, stock portfolios contained 10, 25 or 50 stocks. Researchers J. L. Evans and S. H. Archer found most of the benefits of diversification come from as few as 16 stocks. One wants to avoid holding too many or too few stocks. Larger or smaller portfolios are within the scope of the inventor's invention.

Market Capitalization. The inventor primarily studied two groups. The first stock group includes only stocks with a market capitalization in excess of $150 million (adjusted for inflation); it is called All Stocks throughout this application. The inventor chose $150 million after consulting a trader at a large Wall Street brokerage who felt it was the minimum necessary if he was investing $100 million in 50 stocks in 1995. This figure avoids focusing on tiny stocks and focuses only on those stocks which a professional investor could by without running into liquidity problems. A stock with a market capitalization of $27 million in 1950 is the equivalent of a $150 million stock at the end of 1994. The second stock group includes larger, better-known stocks with market capitalizations greater than the database average (usually the top 16 percent of the database by market capitalization); it is called Large Stocks throughout the application.

Annual Rebalancing. The portfolios studied are constructed and rebalanced annually. Stocks are equally weighted with no adjustment for other variables. For example, if $1,000,000 is invested in 50 stocks, a $20,000 investment is made in each stock. Dividends are re-invested in proportion with the original proportions. At the end of the year, all of the stocks may be sold and replaced with another fifty stocks that meet the criteria of the strategy. Throughout the application, rebalancing refers to this process. Of course, for tax purposes, an investor must be careful in rebalancing that one does not unnecessarily sell and reacquire shares of stock in an existing portfolio when performing the rebalancing. A year was chosen since it is long enough to minimize effects of commissions and costs of rebalancing the portfolio. A term as long as two years or as short as three months could be used as the period after which one rebalances the portfolio in accordance with some investment strategies.

The present invention can allow users to create portfolios that model winning strategies based on the real-time data as it exists in the market at the time of the creation of the portfolio. In preferred embodiments, it is very inexpensive to the user and may revolutionize the multi-trillion dollar mutual fund industry.

DESCRIPTION OF A PREFERRED EMBODIMENT

Referring now to FIG. 1A, a user 101 is connected to the Internet 102. The user 101 connects to the PMP host computer 103 through the Internet 102. The user 101 reviews certain strategies and their historic performance. The information is transmitted across the Internet 102 to the user 101. The information transmitted includes such information as historic performance, sample holdings, modeling how the particular strategy and its holding has performed in the past.

The user, after making appropriate reviews, makes a decision to purchase the names of the stocks in that portfolio. The owner of the PMP host computer 103 collects a payment for this service. This price is preferably $29.95.

Now the user 101 sees a list of stocks provided by the PMP host computer 103. If the user 101 can then make the decision whether to accept or reject any individual stock in the generated list. For example, if the user 101 rejects the tenth stock in a ten stock strategy, the PMP host computer 103 presents the eleventh stock as a substitute which may in turn also be rejected. Once the user 101 has approved the content of the proposed portfolio, the user 101 enters an amount that the user 101 will invest in accordance with the strategy.

If the strategy has 10 stocks, for example, and the user 101 invests $100,000, the user will have $99,970.05 to invest in the 10 stocks or $9,997 per issue.

If the user 101 already has an account with an online broker 104, then the owner of the PMP host computer will receive a one-time fee from that online broker 104 when the user 101 purchases the portfolio through the online broker 104. The one-time fee for referring to an existing account is preferably $30.

If the user 101 does not have an account with an online broker 104, then PMP host computer 103 provides suggestions to select an online broker 104. Once the user selects an online broker 104, then the owner of the PMP host computer will receive a one-time fee from that online broker 104 in the amount of $150. Since online brokerages are currently spending about $400 for each account that opens with them, everyone wins. PMP gets paid, the investor gets a cheap basket trade, and the online brokerage gets a new client. New clients—a) add to income through any margin trades; b) own stocks that may be loaned out by the broker; c) receive credit card and other solicitations; d) increasing assets allowing the broker to be better able to borrow, obtain better financial deals, and increased velocity of trading. The broker also gets to put on the 'white hat' of encouraging investors to be in the market for the 'long term' by providing this type of instrument. The reality is that a 30–40 stock portfolio is more likely to generate trades than an account with less stocks, and so these accounts will be highly prized and perhaps fought over by online brokers. The present invention attempts to drive mid-tier investors online by providing low cost, tax savings, information, and control of the online portfolio. The present invention wants to make the average Morningstar mutual fund an expensive way to achieve the benefits of a diverse portfolio.

Once the user 101 has an online broker account in which to trade and funds have arrived, the user 101 decides to whether or not to buy the list of stocks suggested by the PMP host computer 103. If the user 101 does buy the stocks, the user 101 is presented with a customizable portfolio screen showing all the holdings. This information is optionally stored on the user's harddrive, on the PMP host computer 103, or preferably both. The user can then sign up for automatic notification of drop in price in certain stocks, place sell orders, etc. as necessary. In addition, the user 101 can sign up for automatic proxy voting.

The user winds up with a balanced portfolio of stocks for $30. This is much cheaper than even the cheapest online brokerage charges, and much cheaper than those charges made by traditional brokers. The user's balanced portfolio is akin to their own personal mutual fund, but without some of the disadvantages that plague those mutual funds.

First, the cost of creating and monitoring this diversified individual portfolio is dramatically less expensive than fees associated with other diversified portfolios like mutual funds. Currently, the average fee, called an expense ratio, of all diversified equity funds in the Morningstar database is 1.55%. An investor with a $100,000 investment in the average mutual fund, would face annual expenses of $1,550 before any commissions, sales load, or 12(b)-1 charges. The same investor using the present invention would face substantially lower total expenses, currently contemplated at approximately $60.

The next major advantage of the present invention is the potential for tax managing the diversified portfolio for the individual investor. One of the largest problems of mutual fund investment is the potential for embedded capital gains that will be distributed to all shareholders of record whether or not they enjoyed the gain from the stock being sold.

For example: on day one, investor buys $100,000 of shares in a mutual fund. On day two, the mutual fund liquidates some long-held security (e.g. 1990 Microsoft) and takes a tax hit. Our day one investor has not enjoyed any of the benefit of increase in price of the liquidated asset but takes the full hit of the tax consequence on the value of the mutual fund's shares on day two.

The third benefit the present invention offers individual is that by creating their own diversified portfolio, they will not be affected by the actions of other shareholders. For example, on day one investor buys $100,000 of shares in a mutual fund. The next day, a sufficient minority of current shareholders of that fund decide, for whatever reason, to liquidate their holdings, the NAB of the fund would be materially affected as the portfolio manager would be forced to liquidate current holdings to meet the redemptions. Users of the present invention will face no such calamity because the diversified portfolio is unique to them.

The invention makes possible for the first time the creation of a diversified portfolio that can be selected, invested in, and monitored continually entirely on the Internet.

The portfolio owned by the user would be rebalanced. Preferably, the user 101 is permitted to sign-up for email notification of certain events. For example, if the stock being replaced was too expensive for the portfolio it might be dropped from the list and another stock added in its place. The stock being replaced preferably is sold at a time when it might achieve the best tax advantage (e.g. for some types of accounts under current rules selling 'losers' within one year gets a loss one can use against ordinary income while under current rules selling 'winners' after one year gets one hit against capital gains). Preferably the notifications are sent out via email to remind the user of these possible trades. For example, some strategies call for annual rebalancing, while others call for rebalancing every four or six months or for as long as eighteen months or twenty-four months.

FIGS. 1B through 4A illustrate what a user 101 would view if they connected to the PMP host computer 103 as they investigate the available strategies. FIGS. 1B though 4A illustrate some examples of 'drill down' menus as a 'performance-based' investor might. The 'performance-based' investor is interested mainly in the returns, and not necessarily interested in either a lot of theory or 'hand-holding.' At another point, the path taken by the newer investor is explored.

Referring now to FIG. 1B, FIG. 1B shows a screen area 110 and mouse pointer 111. Screen area 110 shows the ranking of strategies so a 'performance-based' investor can see how different strategies have been ranked based on their past performance. In screen area 110, we can see that the best-performing strategy for a one-month period was 23.00% and the fifth-best performing strategy returned 6.25% for the same period. FIG. 1C shows the mouse pointer 111 pointing at the duration area 112 of screen area 110. A pop-up menu 113 appears at the user signal (usually a mouse click, but also perhaps implemented as a 'mouseover' event without a click). When the user moves the mouse to pop-up menu 113 and selects a different duration (one year), the data appearing in screen area 110 changes to reflect the returns on those strategies.

The user, settling on one-year as the duration of interest, may then investigate what strategies performed to what levels. Referring now to FIG. 2A, the mouse pointer 111 points at the second strategy in the list. A strategy-name pop-up menu 201 appears to the right showing that the second strategy in the list is named "Index Plus A." Referring now to FIG. 2B, the user slides the mouse pointer 101 to the right over a portion of strategy-name pop-up menu 201 and is rewarded with a strategy-description pop-up menu 202. Referring now to FIG. 2C, the user slides the mouse pointer 101 to the right over a sample-holdings screen portion 203. and a sample-holdings pop-up menu 204 appears. The sample-holdings pop-up menu 204 indicates a sample of the type of securities purchased in accordance with that strategy. Referring now to FIG. 2D, the sample-holdings pop-up menu 204 lists the stock "Best Buy" with a star. The star is optionally used to indicate stocks whose companies have paid a sponsorship fee for allowing a link to information about the company, such as "Message from Best Buy to potential investors."

Referring now to FIG. 2E, an alternate menu 205 allows the user a choice of what year they would like to see a sample-holdings pop-up menu.

Figure 3D:
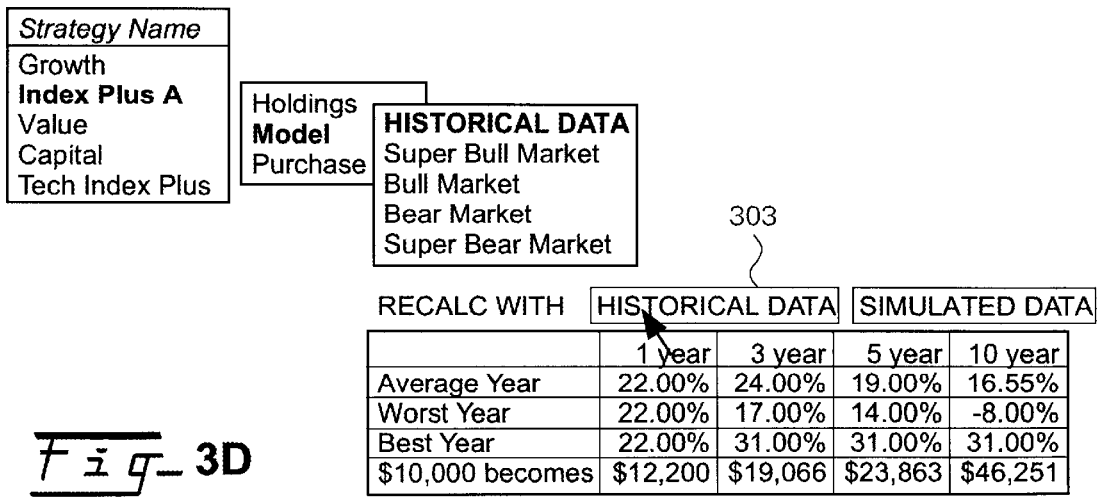

Referring now to FIG. 3A, an alternate drill-down menu 301 appears when the user clicks on the strategy name. The user is presented with a choice to explore holdings, model the portfolio under various market conditions, or purchase the stocks in accordance with the strategy. FIG. 3B shows a 'drill-down' through the model selection to the bull market selection. The user is either presented with random data based on the standard deviations of each of the holdings in each of the strategies or is provided with data similar to the 40-year historical results of that individual strategy. For example, in the bull market the best return was 12.50% for one year, with a 10-year best year of 22.50%. This allows the user to see what typical returns might be with this strategy and allows them to better gauge their own risk tolerance. FIG. 3C shows a typical bear market results. Super-bull and super-bear would present even wilder swings to the good and bad as appropriate. The user can re-calculate additional iterations of bull or bear markets by clicking in simulated data area 302. If the user wishes instead to see how the strategy would have performed based exclusively the underlying historical data, the user can click in the historical data area 303.

An example of a 'mouseover' event can be seen in Microsoft Word 97 and similar programs when one places the mouse pointer over a button on the toolbar. Pointing at the "file, new" button for a few seconds causes the word "NEW" to appear on the screen. All menus and controls are capable as standard mouse-click, secondary mouse-button click, or mouseover events as desired. The preferred embodiments use mouseover events for many of the 'drill-down' menu choices.

Figure 3E:
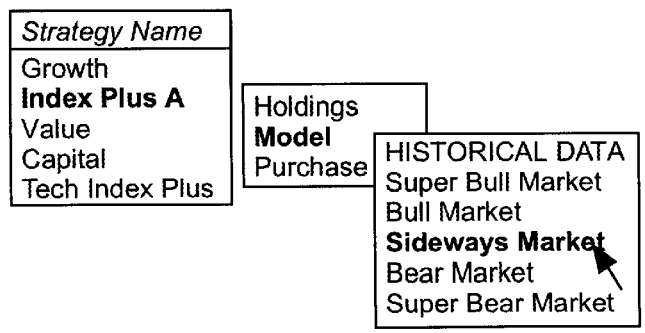

In a preferred embodiment shown in FIG. 3E, the choices for the modeling include a "sideways" or doldrums market, in addition to super-bull, bull, bear, and super-bull markets.

Figure 4A:
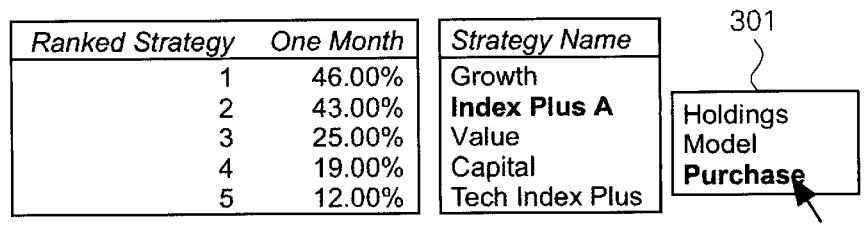
Figure 5:
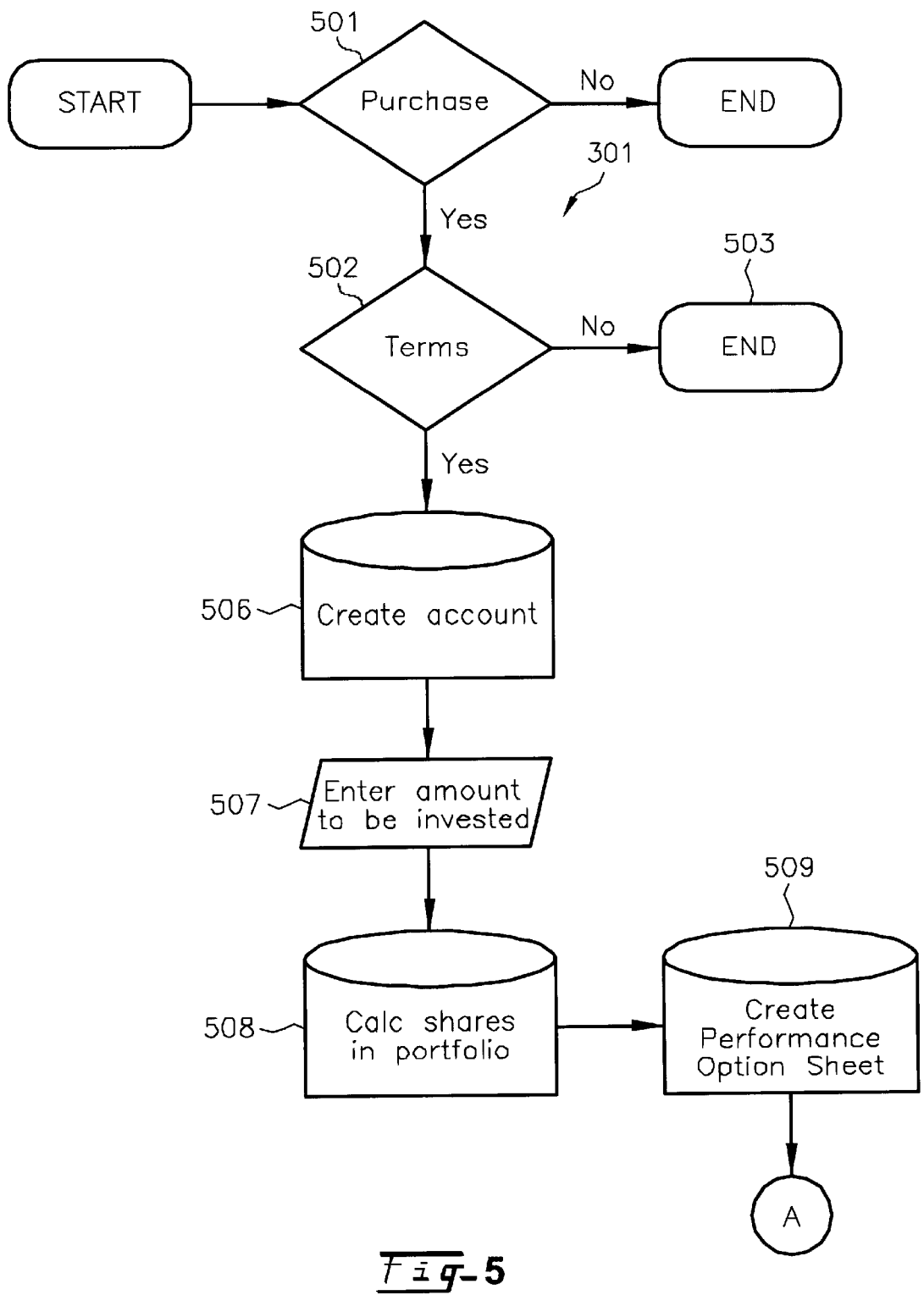
FIG. 5 is a flow chart illustrating aspects of the present invention.

Referring now to FIG. 4A, the user (having reviewed alternative strategies as desired) clicks on purchase in alternate drill-down menu 301.

FIGS. 5 through 10 refer to the purchase process of the present invention. The user decides whether to make a purchase or not at block 501. If the user indicates that they would like to make a purchase, the decide whether or not to accept terms at block 502. Terms include all of the legal disclaimers that one should have in place regarding trading securities in this fashion.

In the event that the user decides not to make a purchase at block 501 or decides to decline the terms at block 502 that results in the end 503. End 503 alternately includes sending the user to a new page containing a message about required terms, returns the user to the start page, or returns the user to their exploration of various strategies.

If the user accepts terms at block 502, including all appropriate financial eligibility (e.g. credit card or other information regarding payment), then a user account is created at block 506. Once the user account has been created, the user is prompted to indicate the amount that the user would like to invest. The amount invested is debited by a first fee and also by a second fee. The first fee is paid to the company generating the information to the user. The second fee is paid by an independent broker depending on the arrangement between the company and the user.

For example, if the user decides to invest $100,000 and the first fee is $29.95 and the second fee is $14.95, then the PMP subtracts those fees to get $99,955.10. This number is divided by the number of stocks in the folio. For example, if there are 20 stocks in the folio, $4997.75 is allocated per stock in the strategy. If the market is open, real-time pricing is preferably used to generate how the 'at-market' portfolio looks on a proposed portfolio sheet. The amount that the user decides to invest is then used to help create a proposed portfolio sheet at block 507.

A proposed portfolio sheet appears in Table 1.

TABLE 1

Proposed portfolio sheet.

| | Stock | Ticker |
|---|---|---|
| 1 | GUESS INC | GES |
| 2 | ALCOA | AA |
| 3 | SALTON INC | SFP |
| . | . | |
| . | . | |
| 19 | 3M | MMM |
| 20 | WAL-MART | WMT |

Figure 6:
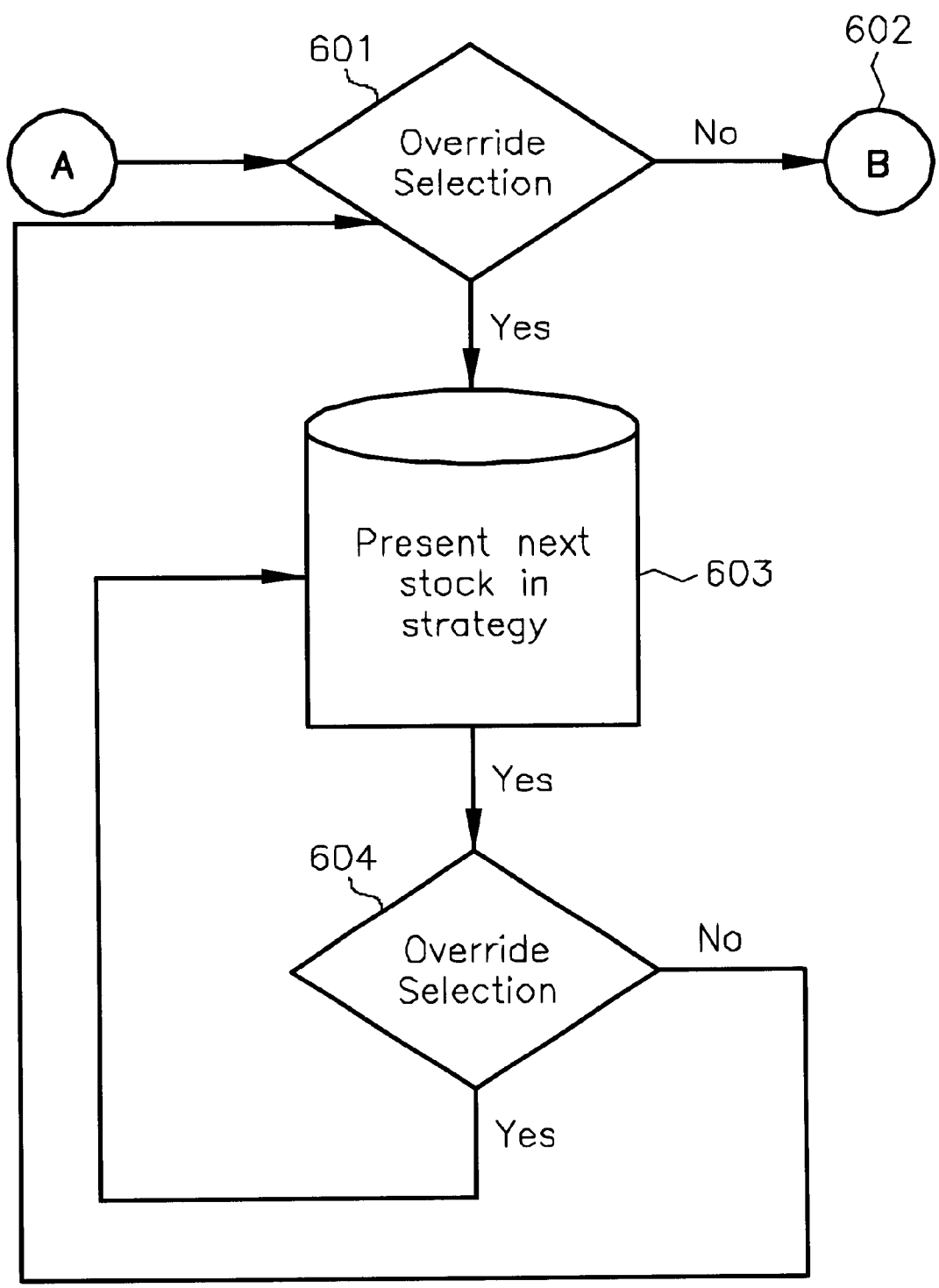
FIG. 6 is a flow chart illustrating aspects of the present invention.

Once the proposed portfolio sheet has been created, the user will have the opportunity to override any or all stocks in the portfolio. Referring now to FIG. 6, the user may opt not to override at block 601 in which case the user moves to block 602. If the user decides to override a stock, the PMP presents the next stock selected by the strategy as the replacement stock at block 603. For example, if a strategy presents 10 stocks and one of them is rejected, the 11th stock is presented to replace the rejected stock. The user is given an opportunity to override that stock as well at block 604 or any other stock in the portfolio at block 601. For example, if a user decided to override Stock 20 Wal-Mart the twenty-first stock (in this case, IBM) selected in accordance with the strategy would be selected in its place. The user-revised proposed portfolio sheet appears as Table 2.

TABLE 2

User-revised proposed portfolio sheet.

| | Stock | Ticker |
|---|---|---|
| 1 | GUESS INC | GES |
| 2 | ALCOA | AA |
| 3 | SALTON INC | SFP |
| . | . | |
| . | . | |
| 19 | 3M | MMM |
| 20 | IBM | IBM |

The proposed portfolio sheet is optionally modified to show such factors as market capitalization, industry, and other relevant columns of information to assist the buyer in the decision to 'pull the trigger.' Also, minimum, maximum, average and median market capitalization, share price, and other factors optionally are displayed as part of the summary of the proposed portfolio.

Figure 7:
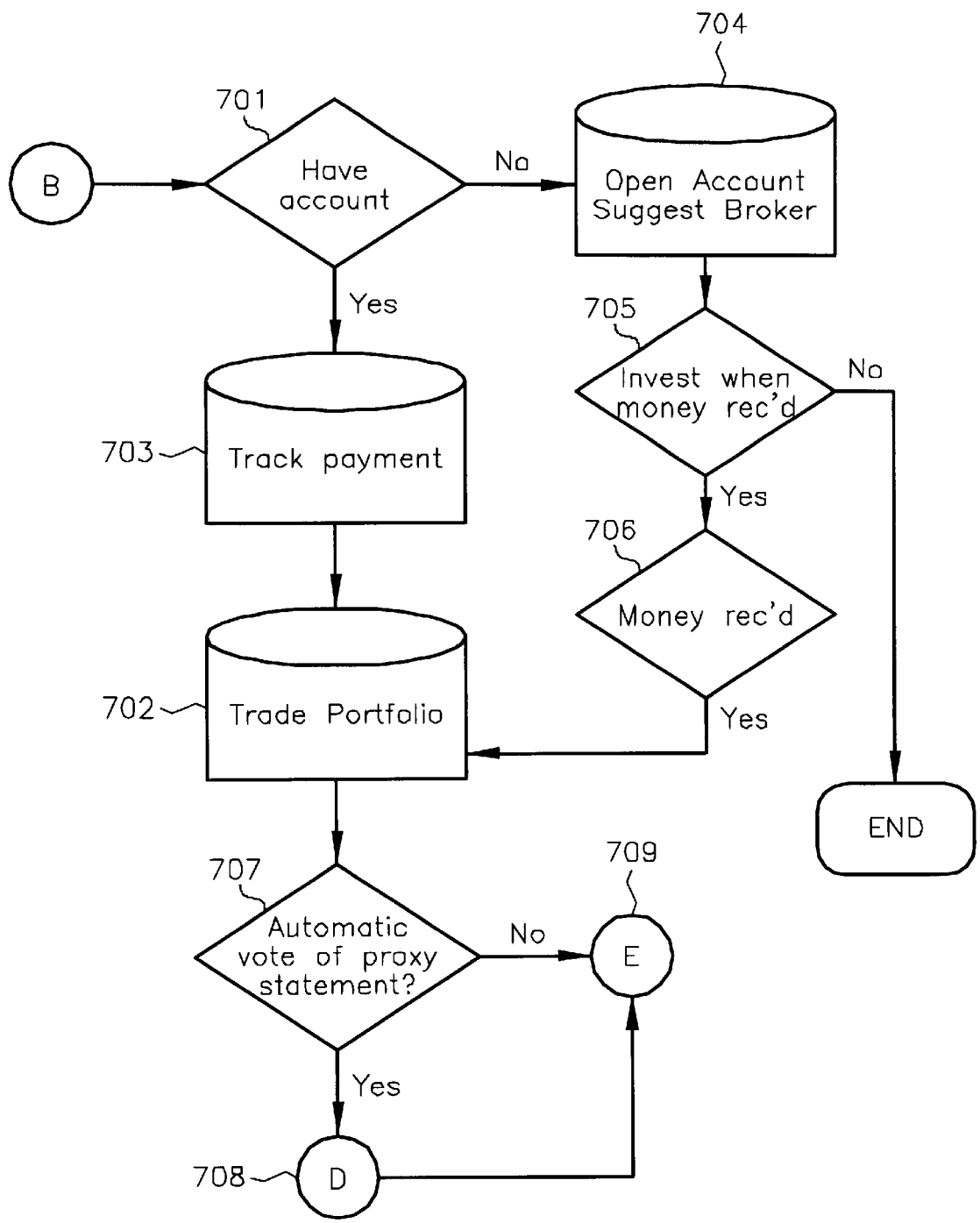
FIG. 7 is a flow chart illustrating aspects of the present invention.

Referring now to FIG. 7, once the user has finalized the selections, the user is asked whether they have an account at an online broker at block 701. Assuming that they do have an account at an online broker, the PMP places a buy order form which is executed by the user at block 702. This preferably happens in real-time. Once the trade has been executed, a custom performance sheet is generated to indicate that the transaction has been completed.

TABLE 3

Abbreviated custom performance sheet
shows how an abbreviated custom performance sheet looks.

| | Stock | Ticker | Price | Shares | Cost |
|---|---|---|---|---|---|
| 1 | GUESS INC | GES | 12.688 | 394 | $4,999.07 |
| 2 | ALCOA | AA | 60.375 | 82 | $4,950.75 |
| 3 | SALTON INC | SFP | 49.000 | 102 | $4,998.00 |
| . | . | | | | |
| . | . | | | | |
| 19 | 3M | MMM | 75.000 | 66 | $4,950.00 |
| 20 | IBM | IBM | 125.000 | 40 | $5,000.00 |
| | | | | Total | $99,591.29 |

Ideally, the total market value of the shares purchased should approach but not exceed the total amount to be invested. Given the data from Table 3, it appears that some $363 remains uninvested from the original $99,955. That is partly due to rounding problems. Rounding the number of shares purchased to the nearest whole number more often will create the problem of purchasing too much stock than some other method of rounding. The inventor believes that some other method of rounding may suffice to mitigate this problem. Alternately, other methods used in the art may be used to create the balanced portfolio without purchasing too many shares and without leaving too much money uninvested.

A simple method rounds down all purchases. That is, when $4997.75 is available for investment in a stock costing 12.688, 4997.75 divided by 12.688=393.8958 shares would be purchased. This appears suboptimal: while this simple method will never purchase more than the total allocated, it will always fall short and by too much. Generally speaking, the larger the number of issues in the portfolio, the larger this problem of underinvestment. Generally speaking, the larger the initial investment, the smaller this problem of underinvestment (as an overall percentage).

Another method to manage the underinvestment problem is shifting the point at which numbers are rounded to err on the side of buying fewer shares. For example, if one rounds 1.799 to 1 but rounds 1.8 to 2 it may mitigate the problem of buying too few or too many shares. A formula used to achieve this result includes Microsoft's Excel spreadsheet's rounding function as follows: =round(input−0.3 , 0) as shown in Table 4.

TABLE 4

| Input | Round (Input - .3, 0) |
|---|---|
| 28.80 | 29 |
| 28.79 | 28 |
| 28.50 | 28 |
| 28.20 | 28 |
| 27.90 | 28 |

If the input is 28.80 shares that should be purchased, it is rounded up to 29 shares. However, if the number of shares that should be purchased is 28.79 shares, then it is rounded down to 28 shares. Other methods to assign the remaining dollars, including over-weighting the last stock purchased, are among appropriate alternatives to solve this allocation over- and under-purchase problem. Other methods known in the art of automated stock selection are contemplated in the present invention.

Referring back to FIG. 7, once the account has been created at block 701, a first fee is optionally paid from the broker to the operator of the present invention at block 702. Since the broker already has the user as a client, the first fee is a pre-negotiated smaller fee than if the user was a new client opening a new account with the broker.

Figures 8A, 8B:
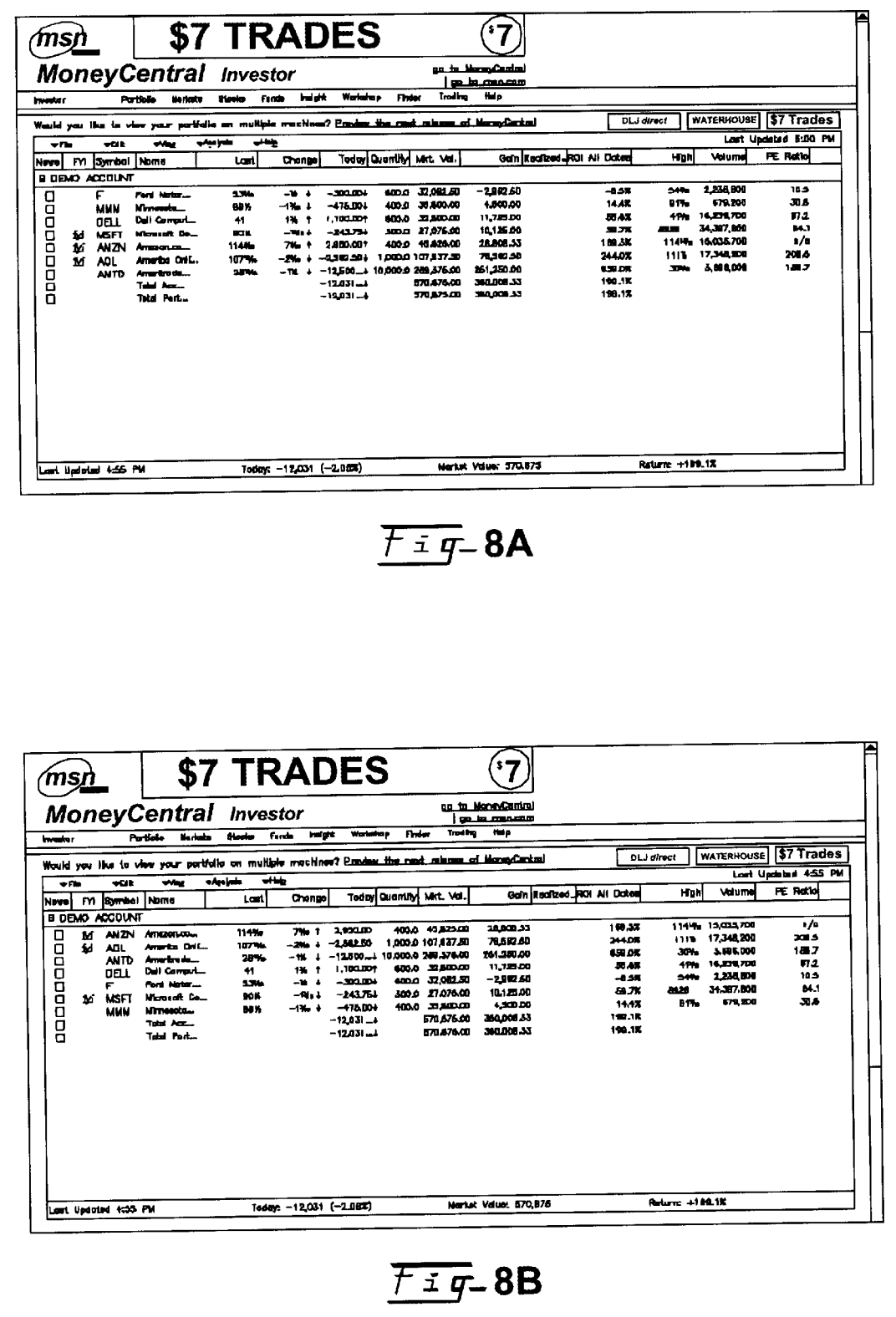

Ideally, the custom performance sheet ties in with quote data (preferably real-time, but alternately delayed) to show the user the present performance of the portfolio. The abbreviated custom performance sheet is optionally modified (by default and/or by a user) to show such factors as market capitalization, industry, and other relevant columns of information. Also, minimum, maximum, average and median market capitalization, share price, and other factors are optionally displayed as part of the summary of the portfolio. It is preferred that the user be able to customize the order of the stocks, presentation of underlying factors (e.g. earnings estimates, price-to-cashflow, market capitalization), as well as being able to sort on any of the underlying factors. This is similar to what is presently (July, 1999) offered on such Internet web sites such as Microsoft Investor (http://investor.msn.com) in its Portfolio Manager. See FIGS. 8A and 8B for a screen captures of a Microsoft Investor screen capture sorting a portfolio based on daily performance and market capitalization. FIG. 8A shows a portfolio sorted by gain. FIG. 8B shows the same portfolio sorted by stock ticker.

Assuming that the user has no account (or wants to open a new account with a different broker), the PMP suggests one or more brokers. If PMP is directing the client to a broker, a unique order form for opening the brokerage account is generated identifying PMP as the portal through which the new client was generated so that the broker will agree when it clicks through to pay pre-specified amount of money to PMP for the placement of a new client.

When the PMP is listing the brokers, the PMP preferably generates additional revenues by selling 'ad placement' to brokers for prospective clients. Depending on the placement, frequency, and prominence of the listing, the broker may pay a higher or lower fee. For example, if E-Trade wished to be listed at the top of the list each time (alternately some percentage of the time) a customer was suggested a choice of brokers, E-Trade would pay a certain price for that privilege. Similarly, if E-Trade wished to be listed as the only broker with a 'banner ad,' they would pay a certain price for that privilege. Alternately, the PMP is optionally set up to present the brokerages in order of customer-satisfaction, low cost, or other schemes as marketing gurus might deem prudent. In any event, a larger pre-negotiated fee is paid from the broker to the operator of the invention. For example, since many online brokerages have expenses that are about $200 to $400 for each new account, a pre-negotiated fee of $100–300 is preferable. As market conditions change, however, these numbers will vary accordingly. Also, to develop market share and 'buy in' from the brokers lower fees may be charged to the brokers in accordance with the present invention.

Once the account is opened at a new broker at block 704, the user is queried at block 705 whether they want their money automatically invested when it is received by the broker. This is important because it may take a little while for the user's money to be made available to the broker since it may be sitting in a money market or since it may take a day or two for a bank transfer to be effective. If the user declines to take that option at block 705, it is preferred that the user's chosen proposed portfolio is saved so that the user can return to authorize the trade once the money arrives at the broker. In a preferred embodiment, when the money is available to the broker an email notification is generated so that the user is informed that the funds are available for investment.

If the user does opt to have the money automatically invested at block 705, then when the money is received at block 706, the portfolio is purchased at block 702 as previously discussed.

Anyone who has ever owned stock knows that the mailed proxy statement can generate an annoying amount of paperwork in which many investors are not at all interested. The individual investor, now easily capable of owning two to four portfolios of twenty stocks each, might be literally buried in documents generated by those publicly traded companies. It is a feature of the present invention to offer to the user the choice of whether or not they would like an automatic vote of their proxy. This would ensure a) their proxy was used to vote and b) they would not be on the receiving end of the time-consuming paperwork generated by their holdings.

Figure 9:
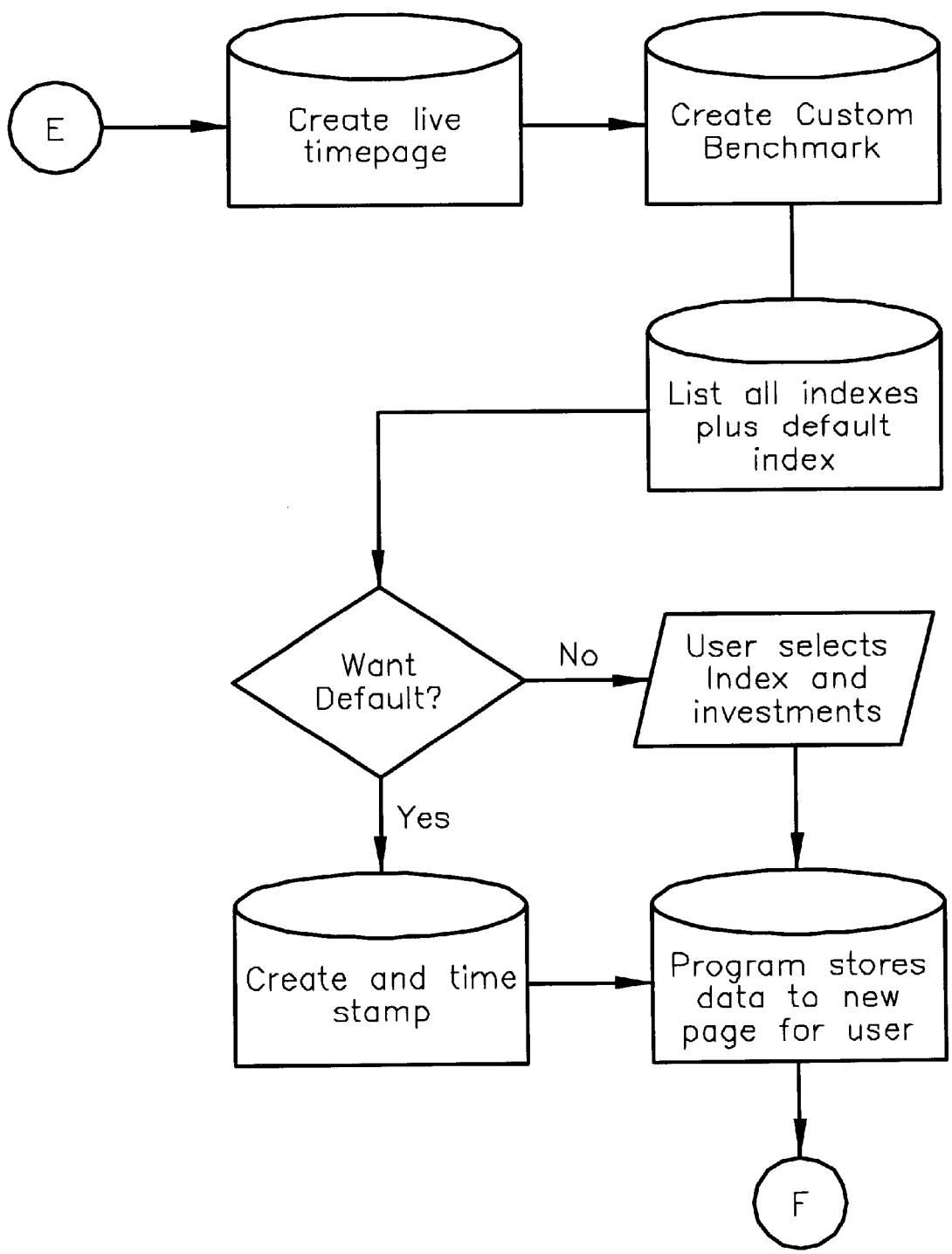
FIG. 9 is a flow chart illustrating aspects of the present invention.

Referring now to FIG. 9, at block 901 the live timepage is created for that individual user that notes what investments were made and where. As previously discussed, the timepage is preferably customizable by the user to show different fields and allows the user to sort based on performance, market value, or other factors displayed onscreen.

An example page appears in Table 5.

TABLE 5

Sample timepage

Today's date: August 14, 1999
Portfolio Purchased: July 20, 1999

| Stock | Ticker | Price Now | Shares | Market Value | Gain (Loss) |
|---|---|---|---|---|---|
| 1 GUESS INC | GES | 15.000 | 394 | $5,910.00 | $910.93 |
| 2 ALCOA | AA | 75.000 | 82 | $6,150.00 | $1,199.25 |
| 3 SALTON NC | SFP | 45.000 | 102 | $4,590.00 | $(408.00) |
| . | | | | | |
| . | | | | | |
| . | | | | | |
| 19 3M | MMM | 90.000 | 66 | $5,940.00 | $990.00 |
| 20 IBM | IBM | 144.000 | 40 | $5,760.00 | $760.00 |
| | | | Total | $113,400.00 | $13,808.71 |

S&P 500 and 50% Growth strategy would have displayed as a default both the S&P 500 and the Growth strategy for comparison. As another example, a Big Cap Value portfolio would be listed with Berra Value and S&P 500 Value for comparison. Referring back to FIG. 9, the user who selects the default at block 903 will have the PMP store the data to a new page for the user at block 904. The storage is preferably done on the remote server, but is optionally stored on the hard drive of the individual user.

If the user prefers, the user may customize the benchmark page to include other information. In the example shown in Table 6, the user's portfolio outperformed all of the other benchmarks except the fictional MELJIM mutual fund.

TABLE 6

Sample benchmark page showing comparisons with indices and mutual funds.

Today's date: August 14, 1999
Portfolio Purchased: July 20, 1999

| Stock | Ticker | Price Now | Shares | Market Value | Gain (Loss) | |
|---|---|---|---|---|---|---|
| 1 GUESS INC | GES | 15.000 | 394 | $5,910.00 | $910.93 | |
| 2 ALCOA | AA | 75.000 | 82 | $6,150.00 | $1,199.25 | |
| 3 SALTON INC | SFP | 45.000 | 102 | $4,590.00 | $(408.00) | |
| . | | | | | | |
| . | | | | | | |
| . | | | | | | |
| 19 3M | MMM | 90.000 | 66 | $5,940.00 | $990.00 | |
| 20 IBM | IBM | 144.000 | 40 | $5,760.00 | $760.00 | |
| | | This portfolio | | $113,400.00 | $13,808.71 | |
| | | S&P 500 | | $103,111.00 | $3,519.71 | 292% |
| | | NASDAQ | | $104,999.00 | $5,407.71 | 155% |
| | | GROWTH MF | | $109,800.00 | $10,208.71 | 35% |
| | | MARBRI MF | | $111,000.00 | $11,408.71 | 21% |
| | | MELJIM MF | | $116,000.00 | $16,408.71 | -16% |

The performance of the portfolio can be contrasted against particular indexes, mutual funds or other strategies over time so that the user can see how their portfolio performs against other strategies. It is preferred that the default indices that are presented are keyed into the type of strategy initially selected by the user. For example, a 50%

Figures 10, 11:
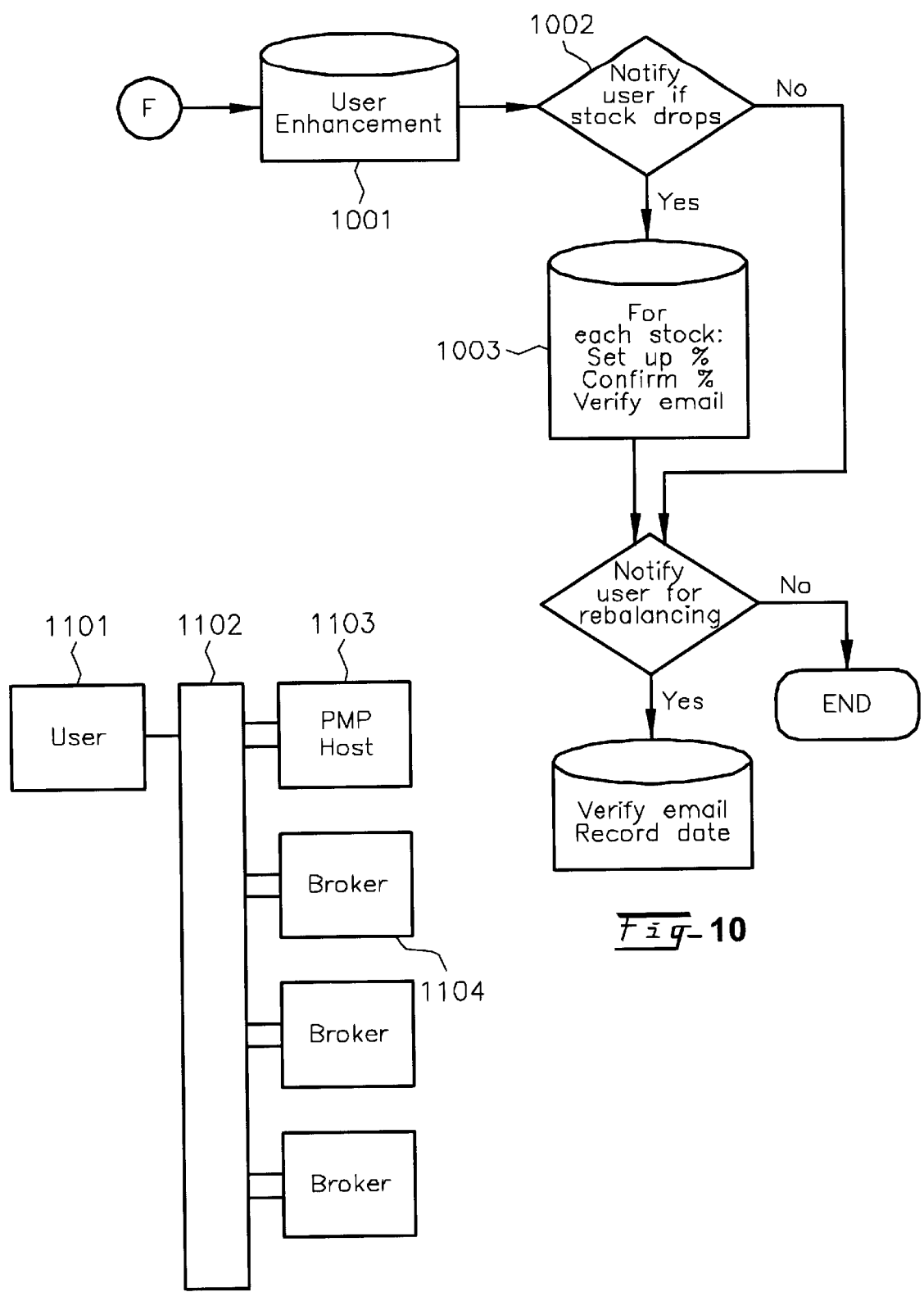
FIG. 10 is a flow chart illustrating aspects of the present invention.
FIG. 11 is a representation of the connections between the user, the PMP host, and online brokers.

Referring now to FIG. 10, the user may further enhance and alter the information presented in the benchmark page in block 1001. Hotlinks to news items or press releases are one example of the type of information that can be added to the benchmark page. Table 7 shows a sample benchmark page showing news.

TABLE 7

Sample benchmark page showing news.

Today's date: August 14, 1999
Portfolio Purchased: July 20, 1999

| FYI | Stock | Ticker | Price | Shares | Market Value | Gain (Loss) | 4997.75 |
|---|---|---|---|---|---|---|---|
| News | GUESS INC | GES | 15.000 | 394 | $5,910.00 | $910.93 | 333.1833 |
| News | ALCOA | AA | 75.000 | 82 | $6,150.00 | $1,199.25 | 66.63667 |
|  | SALTON INC | SFP | 45.000 | 102 | $4,590.00 | $(408.00) | 111.0611 |
|  | . |  |  |  |  |  |  |
|  | . |  |  |  |  |  |  |
|  | . |  |  |  |  |  |  |
| News | 3M | MMM | 90.000 | 66 | $5,940.00 | $990.00 | 55.53056 |
|  | IBM | IBM | 144.000 | 40 | $5,760.00 | $760.00 | 34.7066 |
|  |  |  | This portfolio |  | $113,400.00 | $13,808.71 |  |
|  |  |  | S&P 500 |  | $103,111.00 | $3,519.71 | 292% |
|  |  |  | NASDAQ |  | $104,999.00 | $5,407.71 | 155% |
|  |  |  | GROWTH MF |  | $109,800.00 | $10,208.71 | 35% |
|  |  |  | MARBRI MF |  | $111,000.00 | $11,408.71 | 21% |
|  |  |  | MELJIM MF |  | $116,000.00 | $16,408.71 | −16% |

At any time the user views the sample benchmark page, the user may make changes to it.

Referring now to FIG. 10 at block 1002, a user is preferably queried about whether or not the user would like email notification is any stock drops. The user is given the option to select one or more stocks and to set up a percentage drop after which the user would like to be notified. For example, the user may decide that they want to be notified if ALCOA drops more than 5%, but for IBM and 3M the user has more tolerance for volatility and therefore wants to be notified in the event of a 10% drop. After confirming each of the percentages for each stock, the PMP thereafter verifies the user's email address at block 1003.

Referring now to FIG. 10 at block 1004 the user is queried whether or not they would like to receive notification about rebalancing their portfolio. It is very helpful to have this sort of notice, since depending on the period for which the strategy is being rebalanced there may be tax consequences for sale on certain dates. For example, if 6 stocks no longer meet the criteria defining a 20-stock portfolio they would be resold at the end of the year and new stocks added in their place. If 2 of the stocks were losers, under present rules, it would be a tax advantage to sell those 2 stocks and take a loss against ordinary income. If 4 stocks were winners, it would make sense to wait to sell those stocks after the 12 month period so that the income would be characterized as capital gains. If tax laws change, so would the rebalancing suggestions made via email to the user.

Referring now to FIG. 11, a user sits down at her terminal 1101 and connects via the Internet 1102 to the PMP-host site 1103. The PMP-host site 1103 is where account information resides. User 1103 explores the site and settles on an investment strategy. Once the user has settled on the strategy, the user opens an account at the host-site 1103. The user is charged money, then provided access to the list of stocks that meet the criteria of the chosen strategy. The user is then prompted as to whether they have an existing account with an online broker 1104. If they do, then they are asked if they want to execute that trade. Once the trade is executed, a portfolio sheet is created and stored on the host-site 1103. If the user does not have an account at an online broker 1104, the user is directed to a list of online brokers 1004 from which they may choose. The host-site presents whatever information the online broker needs in order to open an online account.

Figure 12:
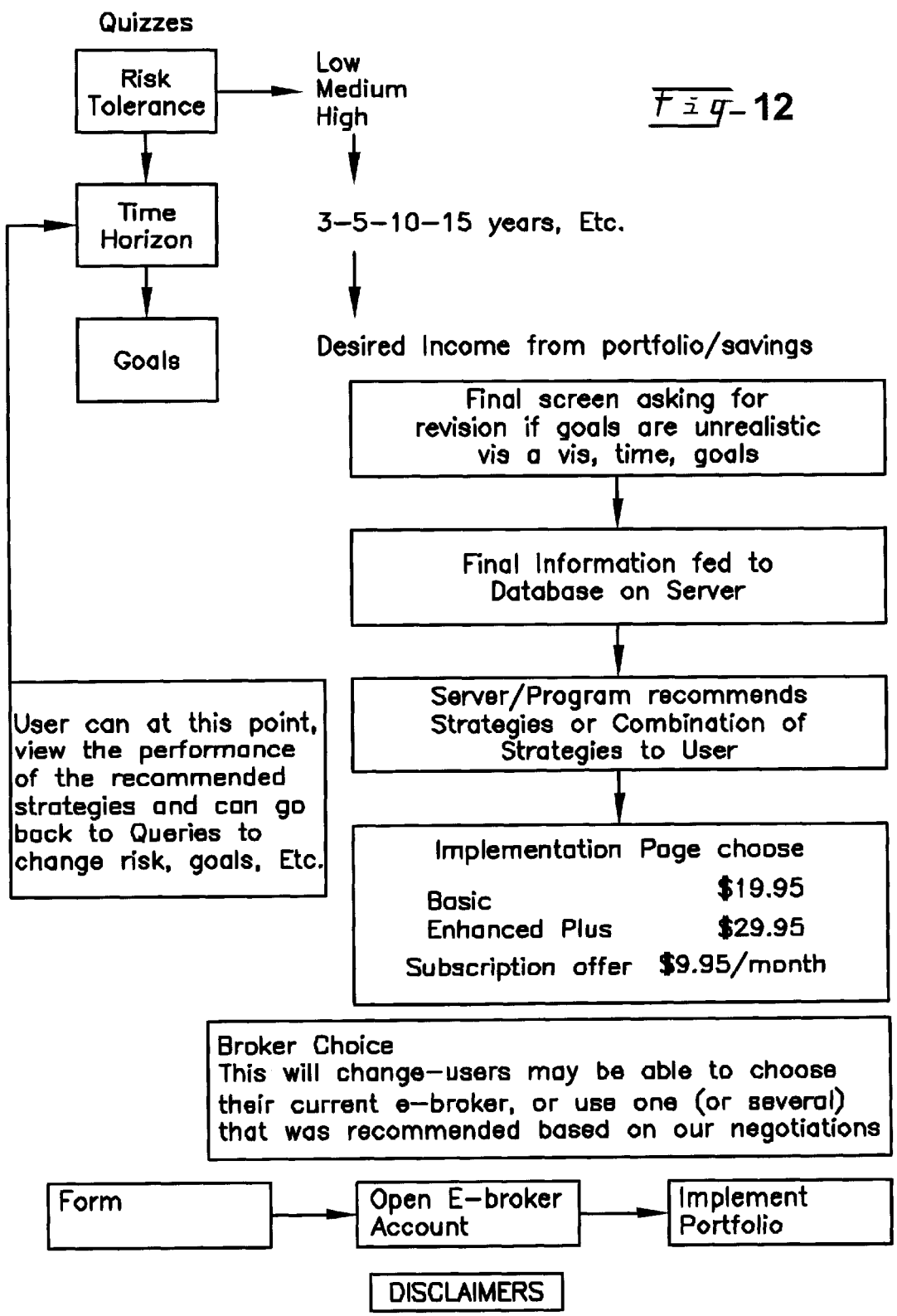
FIG. 12 is a flow chart illustrating aspects of the present invention.

Referring now to FIG. 12, a novice is presented with a different entry point than the aforementioned 'performance-based' investor. The novice would be encouraged to take a quiz regarding risk tolerance (low, medium, or high), time horizon(s), and goals (e.g. buy a house in three years, college for the kids in ten years, retirement in twenty-five to thirty years). After the completion of the quizzes, the PMP can suggest appropriate strategies to meet the individual investor's goals. From that point, the 'novice' or newcomer can investigate the various performance factors and make decisions regarding the selection and purchase of individual stocks as discussed in other parts of this document.

Figure 13:
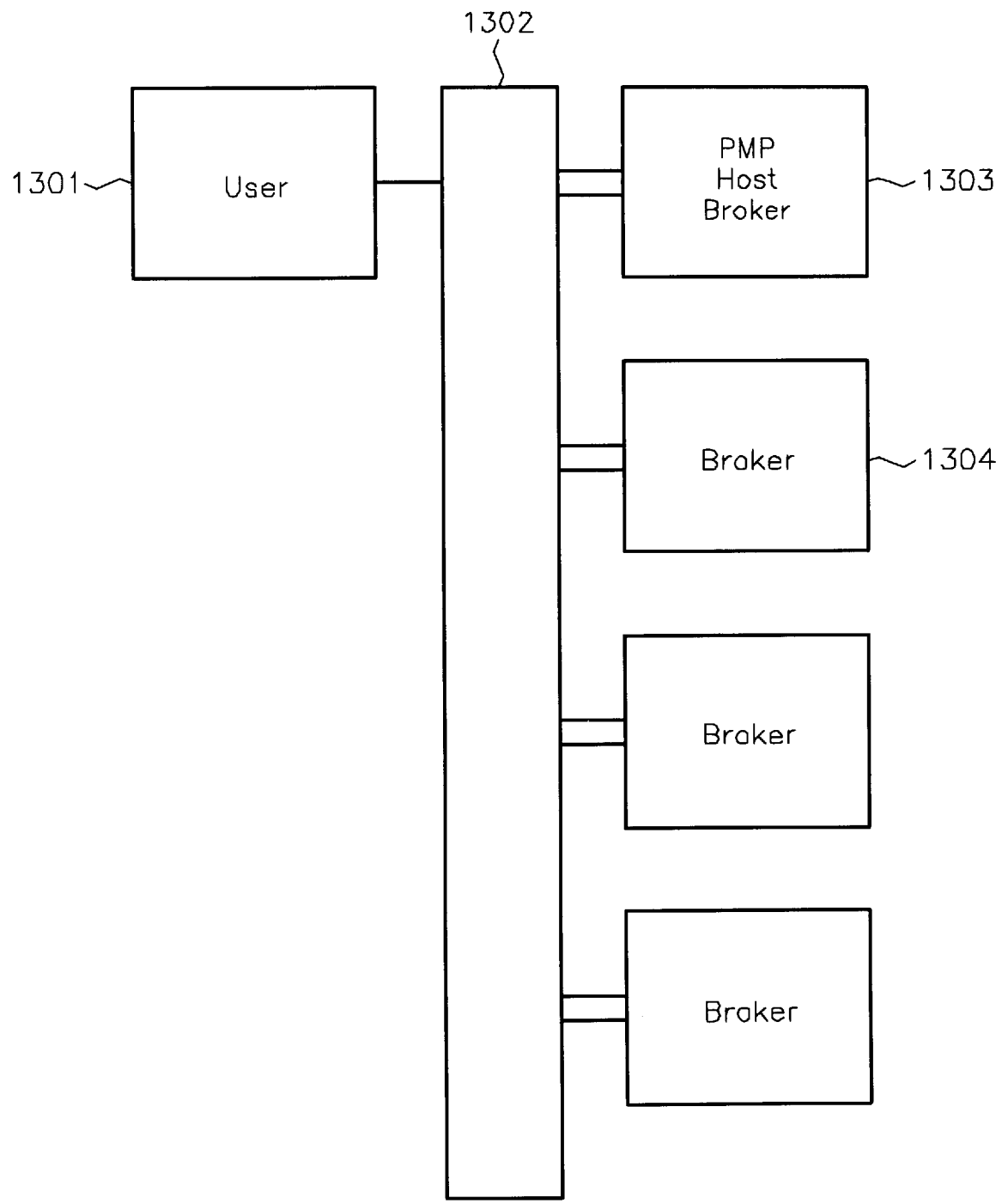
FIG. 13 is a representation of the connections between the user, the PMP host, and online brokers.

Referring now to FIG. 13, it is contemplated as part of the present invention that the owner of the PMP is optionally enabled as an online broker. In that instance, the online broker functions would not be distributed across multiple entities. The user 1301 would connect to the Internet 1302 and then connect directly to the PMP owner-broker 1303. Even when the PMP owner-broker 1303 has the capabilities to do the trades, there may still be advantages to allowing a user 1301 with an account at a different online broker 1304 with whom they are comfortable (or for simplified accounting and money management) to keep their funds in that other online broker 1304.

It is contemplated by the present invention for the user to individually review each of the component strategies available at PMP and create out of such strategies his own unique portfolio in which he decides to invest after reviewing the historical performance data from PMP's database. For example, a sophisticated investor decides to make a composite custom portfolio based on the top 5 stocks from each of 3 different strategies. Table 8 illustrates the choices.

TABLE 8

Top 5 Stocks from Growth, Index A, Tech Index Plus.

| GROWTH | INDEX A | TECH INDEX PLUS |
|---|---|---|
| WMT | MO | MSFT |
| MSFT | DD | DELL |
| T | F | CSCO |
| HD | FTU | CREE |
| BBY | X | LU |

The investor decides to 'tweak' the choices a bit. MSFT (Microsoft) appears in two columns and would be 'double-weighted' in this portfolio. Since the investor already has some Microsoft stock, he eliminates it from the Tech Index Plus in favor of the sixth stock in that strategy, IBM (IBM). The investor looks at the Index A which includes Phillip Morris (MO), Dupont (DD), Ford (F), First Union (FTU), and U.S. Steel (X). The investor dislikes U.S. Steel (X) and eliminates that stock in favor of Merck (MRK). See Table 9.

TABLE 9

Top 5 Stocks from Growth, Index A, Tech Index Plus.

| GROWTH | INDEX A | TECH INDEX PLUS |
|--------|---------|-----------------|
| WMT    | MO      | DELL            |
| MSFT   | DD      | CSCO            |
| T      | F       | CREE            |
| HD     | FTU     | LU              |
| BBY    | MRK     | IBM             |

Had the investor attempted to buy these stocks at a traditional broker with a $50 fee per stock, the investor would have spent $750 to acquire this portfolio. Assuming a $60,000 investment, that's a sizable expense especially compared with a one-time charge of $30 or $60 to acquire the same portfolio through the present invention. Assuming a $60 price for this well-diversified portfolio, that's a cost of 0.001. Assuming a cost of $750 for the same purchase by broker, that's a cost of 0.0125. Assuming a cost of $14.95 a trade that is still $224.25 or 0.00373.

A $10,000 investment at 11% for 40 years is worth around $650,000 while the same investment at 12% for 40 years is worth around $930,000. Percentages add up, especially when they work against you coming AND going. A $10,000 investment at 13% for 40 years is more than $1,327,000: almost double the aforementioned return on 11%. The price advantage of the present invention can be leveraged with each transaction that takes advantage of the lower cost and efficiency.

It is contemplated that annual rebalancing of portfolios may take place. As has been discussed, it is often helpful to sell "losers" before the expiry of one year so the loss may be counted against ordinary income. While it would be preferred that the selling of the "losers" would also be a basket trade executed by the user (or agent) with a special order generated by the PMP, it is not likely that independent brokers will allow those trades at the steep discount provided by the PMP. However, the "winners" would preferably be sold in that fashion, and the new replacement stocks would also be obtained through the PMP to keep trading costs down.

While the above provides a full and complete disclosure of the preferred embodiments of this invention, equivalents may be employed without departing from the true spirit and scope of the invention. Such changes might involve alternate databases, processes, criteria, structural arrangement, capacities, sizes, operational features, reports or the like. Therefore the above description and illustrations should not be construed as limiting the scope of the invention which is defined by the appended claims.

I claim:

1. The method for allowing a user to select strategies and stocks for an inexpensive trade, including: providing a host computer connected to a global computer network; providing said host computer with a portfolio management program; providing said host computer with storage where user account information may be stored; providing at least one user the opportunity to open an account with the portfolio management program owner; providing the user the opportunity to evaluate, select, and modify different methods to choose a recommended portfolio of stocks; providing the use the opportunity to evaluate a strategy's performance over various periods of time; providing the user the opportunity to model the performance of a selected strategy with simulated data; providing the user the opportunity to model the performance of a selected strategy with historical data when said historical data is available; providing the user the opportunity to view the sample holdings of a selected strategy; providing the user a means for inputting the amount of money said user wishes to invest; providing means for calculating the number of shares of each holding that can be purchased through use of quote data; providing a performance option sheet, wherein the user has the opportunity to reject any or all stocks selected in accordance with a particular strategy; providing the user an opportunity to perform the purchase of the selected portfolio through an existing online broker account; providing the user an opportunity to acquire an account at an online broker; receiving from the broker a first referral fee if the user already has an account at that broker; receiving from the broker a second referral fee if the user does not already have an account at that broker; providing for the purchasing user a customized performance page; providing the purchasing user the opportunity to create alerts in the event that any or all stocks drop by certain percentages; providing the purchasing user the opportunity to elect to have the owner of the portfolio management program vote the proxies of any or all issues; providing the purchasing user the opportunity to receive an email reminding the purchasing user of any rebalance dates; providing the purchasing user a custom benchmark; providing the user the opportunity to customize the custom benchmark through the addition or elimination of certain indices and measures; providing the user the opportunity to accept the default version of the custom benchmark; providing means for storing the user's custom benchmark on the local machine; providing means for storing the user's account information on the portfolio management program host machine; providing the user means for adding user enhancements to the custom benchmark page; said enhancements including news, fyi, and alerts on each issue.

2. The method of claim 1, further comprising a newcomer's entry path with investment quizzes.

3. The method of claim 1, further comprising an experienced investor's entry path.

4. The method of claim 2, further comprising an experienced investor's entry path.

5. Apparatus to perform the method of claim 1.

6. Apparatus to perform the method of claim 2.

7. Apparatus to perform the method of claim 3.

8. Apparatus to perform the method of claim 4.

* * * * *